(12) United States Patent
Balutto (10) Patent No.: US 9,279,514 B2
(45) Date of Patent: Mar. 8, 2016

(54) AIR RELEASE VALVE

(76) Inventor: Allistair Potroneus Balutto, Johannesburg (ZA)

(*) Notice: Subject to any disclaimer, the term of this patent is extended or adjusted under 35 U.S.C. 154(b) by 192 days.

(21) Appl. No.: 13/885,647

(22) PCT Filed: Nov. 16, 2011

(86) PCT No.: PCT/IB2011/055119
§ 371 (c)(1),
(2), (4) Date: May 15, 2013

(87) PCT Pub. No.: WO2012/066487
PCT Pub. Date: May 24, 2012

(65) Prior Publication Data
US 2013/0220442 A1 Aug. 29, 2013

(30) Foreign Application Priority Data
Nov. 16, 2010 (ZA) .................................. 2010/08207

(51) Int. Cl.
*F16K 24/04* (2006.01)
*F24D 19/08* (2006.01)
*F16L 55/027* (2006.01)

(52) U.S. Cl.
CPC ............. *F16K 24/044* (2013.01); *F16K 24/042* (2013.01); *F16L 55/027* (2013.01); *F24D 19/083* (2013.01); *Y10T 137/0318* (2015.04); *Y10T 137/3099* (2015.04)

(58) Field of Classification Search
CPC ..... F16K 24/04; F16K 24/042; F16K 24/044; F16K 1/526; F16K 15/063; F16K 15/066; F16L 55/027; F24D 19/083

USPC ......................................................... 137/202
See application file for complete search history.

(56) References Cited

U.S. PATENT DOCUMENTS 2,340,220 A   5/1940 Hedfield
4,011,884 A * 3/1977 Drori ............................ 137/202
(Continued)

FOREIGN PATENT DOCUMENTS

DE           362584      8/1921
DE         33 21 361 A1  12/1984
WO    WO 2008/087230 A1  7/2008

OTHER PUBLICATIONS

International Search Report mailed Mar. 15, 2012 for International Application No. PCT/IB2011/055119 filed Nov. 16, 2011.

*Primary Examiner* — William McCalister
*Assistant Examiner* — Ian Paquette
(74) *Attorney, Agent, or Firm* — Knobbe Martens Olson & Bear, LLP (57) ABSTRACT

An air release valve which includes a housing, an inlet, an outlet, a valve seat, a buoyant closure member and a variable throttle arrangement is provided. The housing defines a chamber and the buoyant closure member is positioned in the chamber and is displaceable between a lower position in which it is clear of the valve seat and permits the flow of fluid through the chamber and an upper position in which it seats sealingly against the valve seat to interrupt the flow of fluid through the chamber, the closure member being displaced, in use, from its lower position to its raised position by the buoyant forces acting thereon as a result of the entry of liquid into the chamber through the inlet. The throttle arrangement is configured to throttle air flow and inhibit premature closing of the closure member.

18 Claims, 6 Drawing Sheets

(56) References Cited

U.S. PATENT DOCUMENTS

| | | | |
|---|---|---|---|
| 4,163,456 A * | 8/1979 | Herron | 137/202 |
| 5,439,023 A | 8/1995 | Horikawa | |
| 5,511,577 A * | 4/1996 | Richards et al. | 137/202 |
| 7,793,682 B2 * | 9/2010 | Smit | 137/391 |
| 8,807,156 B2 * | 8/2014 | Lang et al. | 137/202 |
| 2004/0050418 A1 | 3/2004 | Yoshihara et al. | |
| 2004/0107992 A1 * | 6/2004 | Richards | 137/202 |
| 2008/0276994 A1 * | 11/2008 | Goetzinger et al. | 137/218 |
| 2009/0139581 A1 * | 6/2009 | Herlihy | 137/202 |
| 2012/0037834 A1 * | 2/2012 | Lang et al. | 251/368 |
| 2013/0092254 A1 * | 4/2013 | Weingarten | 137/409 |

* cited by examiner

AIR RELEASE VALVE

RELATED APPLICATIONS

This application is the U.S. National Phase filing under 35 U.S.C. §371 of PCT/IB2011/055119, filed Nov. 16, 2011, which designated the United States and was published in English on May 24, 2012, which claims priority under 35 U.S.C. §119(a)-(d) to South African Patent Application No. 2010/08207, filed Nov. 16, 2010.

THIS INVENTION relates to an air release valve.

The invention relates particularly to an air release valve of the type that can be used in conjunction with a liquid reticulation system, and in particular a water pipeline.

It is known in relation to a water pipeline that it is often required to purge the pipeline of air present therein. Such air particularly may be present within the pipeline before water flow through the pipeline is initiated, i.e. when the pipeline is empty. Also, during flow of water through the pipeline, air in suspension in the water and pockets of air in the pipeline may collect in certain regions of the pipeline, typically peak regions and certain substantially flat sections.

An air release valve that provides for the release of air from a water pipeline, in its simplest form, includes an elongate valve body that defines a passage therethrough, along a longitudinal axis thereof that leads from an inlet end to an outlet end. The valve body is operatively mounted on a pipeline, particularly so that the inlet end of the passage communicates with the pipeline and the passage itself is substantially vertically disposed and leads upwardly to the outlet end thereof. The valve body defines a valve seat at the outlet end of the passage. The valve includes also a valve closure arrangement within the passage, the arrangement including a float that serves as a valve closure also. The float is axially displaceable within the passage defined by the valve body, particularly between a closed position, in which it seats against the valve seat, and variable open positions, in which it is spaced from the valve seat, to expose the valve outlet. The open positions of the float are below its closed position.

In relation to a water pipeline having an air release valve of the above type mounted thereon in a suitable location for the release of air from the pipeline, in an initial condition of the pipeline, it is devoid of water and filled with air substantially at atmospheric pressure. In this initial condition the float is in an open position. When water is pumped into the pipeline, upstream of the valve, the advancing water pressurises the air in the pipeline downstream of the water. Air then initially passes through the air release valve, particularly past the float via a flow passage defined between the float and the surrounding valve body, the air escaping via the outlet of the valve body to the atmosphere. The air flow past the float may create a low pressure region above the float such as to cause it to be abruptly lifted into its closed position, thereby abruptly closing the valve outlet. Such closing of an air release valve is sometimes referred to as "premature closing" and may cause mass oscillation or surges in the associated pipelines. Should the float not be lifted into its closed position under such air flow, water entering into the passage defined within the valve body, when air release is being completed, will induce upward displacement of the float, particularly until it reaches its closed position when air release is at least substantially complete. Such closure of the valve can occur abruptly again and may also cause transients of water in the pipeline.

Insofar as further elements of an air release valve of the above and similar types are well known, they are not described in further detail herein.

Mass oscillation or surges and transients or water hammer as may occur in conjunction with the use of an air release valve of the above type may result in damage to a pipeline, e.g. a burst. As such, it has been an object to provide an air release valve in conjunction with the use of which, the problem of mass oscillation or surges and transients or water hammer is at least ameliorated.

The inventor is aware of a valve closure arrangement for use in an air release valve of the above type which provides for a float and a valve closure that is displaceable towards and away from each other between an abutting position and variable spaced apart positions. In the abutting position, abutment particularly occurs within an area which is small, compared to the maximum cross-sectional area of the float in a horizontal plane, so that substantially the entire top surface of the float is exposed to the fluid pressure in the passage in the valve. The closure itself is biased downwards by gravity, i.e. to open. An upper limit position of the float is thus defined when the valve closure is in its closed position and the float abuts against the closure. The float is displaceable between this upper limit position and a lower limit position, through a range of intermediate positions. Also, an air flow passage is defined between the operative top and bottom of the valve closure, the passage having an inlet within the said area within which abutment occurs between the float and the closure, and an outlet that communicates with the atmosphere. With the float abutting against the closure, the air flow passage defined through the closure is blocked off by the float. With the float spaced apart from the closure, the air flow passage is open. Insofar as the features of this new closure arrangement also are known they are not described in further detail herein.

Although use of this known valve closure arrangement within an air release valve has been advantageous, the solution to the surge and water hammer problem was not achieved.

The Inventor is aware of yet another air release valve which includes a partition dividing the valve body into an upper and lower chamber, the partition having a hole therethrough connecting the upper and lower chambers in flow communication. In the upper chamber a valve closure arrangement similar to that described above is provided. In the lower chamber a regulator float is located for axial displacement and is configured to permit fluid flow from the inlet past the regulator float to the aperture in the partition. The regulator float is displaceable between a first position, in which substantially free flow through the passage defined by the partition is permitted, and a second position, in which fluid flow is restricted. Although the provision of the regulator float does provide a certain throttling action, the configuration is such that the regulator float moves instantaneously from a fully open to a restricted position as soon as sufficient differential pressure is achieved across the lower end of the float. This abrupt action will create a transient pressure in the valve which can be damaging to the pipeline and system.

It is an object of this invention to provide means which the Inventor believes will at least ameliorate the problems with the prior art valves.

According to one aspect of the invention there is provided an air release valve which includes:
- a housing defining a chamber;
- an inlet leading into the chamber at or towards the bottom thereof, the inlet being connectable to a fluid reticulation system;
- an outlet leading from the chamber at or towards a top thereof;
- a valve seat positioned between the inlet and the outlet;

a buoyant closure member positioned in the chamber and displaceable between a lower position in which it is clear of the valve seat and permits the flow of fluid through the chamber and an upper position in which it seats sealingly against the valve seat to interrupt the flow of fluid through the chamber, the closure member being displaced, in use, from its lower position to its raised position by the buoyant forces acting thereon as a result of the entry of liquid into the chamber through the inlet; and a variable throttle arrangement for providing a throttling effect, the throttle arrangement being positioned between the valve seat and the outlet and being configured to throttle air flow and inhibit premature closing of the closure member.

The valve may include a flow control element which is displaceable, under the influence of air flow from the inlet to the outlet, from a rest position towards a displaced position in which there is a greater throttling effect than at the rest position, the flow control element being biased towards its rest position.

According to another aspect of the invention there is provided an air release valve which includes:

a housing defining a chamber;

an inlet leading into the chamber at or towards the bottom thereof, the inlet being connectable to a fluid reticulation system;

an outlet leading from the chamber at or towards a top thereof;

a valve seat positioned between the inlet and the outlet;

a buoyant closure member positioned in the chamber and displaceable between a lower position in which it is clear of the valve seat and permits the flow of fluid through the chamber and an upper position in which it seats sealingly against the valve seat to interrupt the flow of fluid through the chamber, the closure member being displaced, in use, from its lower position to its raised position by the buoyant forces acting thereon as a result of the entry of liquid into the chamber through the inlet; and a variable throttle arrangement for providing a throttling effect, the throttle arrangement being positioned between the inlet and the outlet and including a flow control element which is displaceable, under the influence of air flow from the inlet to the outlet, from a rest position in which the throttling effect is at a minimum, towards a displaced position, in which the throttling effect is at a maximum, and a resilient bias arrangement biasing the flow control element towards its rest position.

The throttle arrangement may be positioned between the valve seat and the outlet.

According to yet another aspect of the invention there is provided a method of venting air from a pipeline during filling thereof with a liquid, the method including the steps of providing an air release valve having a housing defining a chamber, an inlet leading into the chamber at or towards the bottom thereof and which is connected in flow communication with the pipeline, an outlet, located above the inlet, and leading from the chamber or being in flow communication with the chamber, a valve seat position between the inlet and the outlet, and a buoyant closure member positioned in the chamber and displaceable between a lower position, in which it is clear of the valve seat and permits the flow of air through it through the chamber, and an upper position, in which it seats sealingly against the valve seat to interrupt the flow of fluid through the chamber, which method includes throttling air flow through the valve by means of a variable throttle arrangement to limit the rate of flow and inhibit premature closing of the closure member.

Preferably, the throttle arrangement is positioned between the valve seat and the outlet.

The outlet may be located at or towards a top of the chamber.

The chamber may be elongate and have a longitudinal axis which extends vertically, the inlet and outlet being arranged coaxially at vertically spaced apart positions.

The housing may include a valve body having a bottom through which the inlet extends, a tubular central part extending upwardly from the bottom, a top which has an aperture extending therethrough and which defines the valve seat around the aperture and a neck extending upwardly from the top and defining a flow path in the neck. The throttle arrangement may include a flow control element which includes a throttle member, the flow control element being mounted in the flow path for displacement between a rest position, towards which it is biased and in which the area between the throttle member and the neck is at a maximum, thereby minimising resistance to flow through the flow path and hence through the chamber, and a displaced position in which the area between the throttle member and the neck is reduced, which serves to restrict air flow through the flow path and hence through the chamber. The throttle member may or may not be integral with the remainder of the flow control element.

The cross-sectional area of the flow path may diverge away from an upper end of the neck, i.e. downwardly, for at least part of the length of the flow path in the neck.

The flow control element may include a stem which extends axially and has a lower end to which the throttle member is connected. The throttle member may be circular and have a convex lower surface, thereby to smooth the flow of air exiting the valve around the throttle member. Further, by being convex, the surface area of the lower surface is increased which increases the sensitivity in reaction to pressure differential changes between atmosphere and the interior of the valve.

The throttle member may have an upper surface in which an annular concave recess may be provided. It is believed that this can serve to ensure efficient air intake under pipeline draining conditions when air is flowing into the valve through the outlet and into the pipeline, i.e. when the valve is functioning as a vacuum release valve.

In one embodiment of the invention, the stem may be supported for axial displacement in a guide. The flow control element may be urged towards its lower position by a spring mounted between the guide and the throttle member.

In another embodiment of the invention, the upper end of the stem may be connected to a damping arrangement. The damping arrangement may include a cylinder within which a piston is mounted for vertical reciprocation, an upper end of the stem being connected to the piston.

A bleed opening may open out of the cylinder at or towards a top thereof connecting the interior of the cylinder above the piston in flow communication with the atmosphere. A passage may extend through the flow control element and the piston such that a lower end of the passage opens out of the lower surface of the throttle member and an upper end of the passage opens out of the piston into the cylinder above the piston. The passage through the flow control element and the piston may extend axially.

In another embodiment of the invention, the throttle arrangement may include an annular shoulder provided in the neck, the shoulder defining an axial passage and the flow control element having a body with an upper end which extends through the passage, the body being hollow and having a base and a side wall which tapers inwardly away from the base, with at least one slot being provided in the side wall. The width of the at least one slot may increase away from the base. The body may be axially displaceable relative to the shoulder. Thus, when the flow control element is in its rest position, flow through the at least one slot is relatively unimpeded but as the flow control element is displaced towards its displaced position, flow through the at least one slot is restricted by the shoulder. Preferably, a plurality of spaced apart slots is provided in the side wall.

The base may be convex. An opening may extend through the base.

The flow control element may be urged towards its rest position by means of a coil spring mounted in compression between the flow control element and a stop provided on the neck and above the shoulder.

The side wall may taper inwardly away from the base.

In another embodiment of the invention, the throttle arrangement may include a restrictor mounted in the neck and an annular shuttle which is longitudinally displaceable relative to the restrictor between a rest position in which the space between the shuttle and the restrictor is at a maximum and the throttling effect is at a minimum and a displaced position in which the space between the shuttle and the restrictor is at a minimum and the throttling effect is at a maximum. The valve may include a stop located on the neck and the shuttle may be urged towards its rest position by means of a coil spring mounted in compression between the shuttle and the stop.

The closure member may include a lower buoyant member and an upper buoyant member, each including axially spaced upper and lower surfaces, with and an axially extending orifice extending through the upper buoyant member, the upper surface of the upper buoyant member being configured to seat sealingly against the valve seat. The upper buoyant member may be arranged coaxially with the lower buoyant member and be axially displaceable relative thereto. The orifice may have an upper and a lower end which respectively open out of the upper and lower surfaces of the upper buoyant member, and the lower buoyant member may include a complementary seal on the upper surface thereof such that, in use, when the upper and lower buoyant members are in abutment, the lower end of the orifice may be sealed against the complementary seal.

A portion of the orifice at or adjacent the lower end thereof may be in the form of a venturi which has a self-cleaning effect.

The invention will now be described, by way of example, with reference to the accompanying diagrammatic drawings.

In the drawings.

Figure 1:
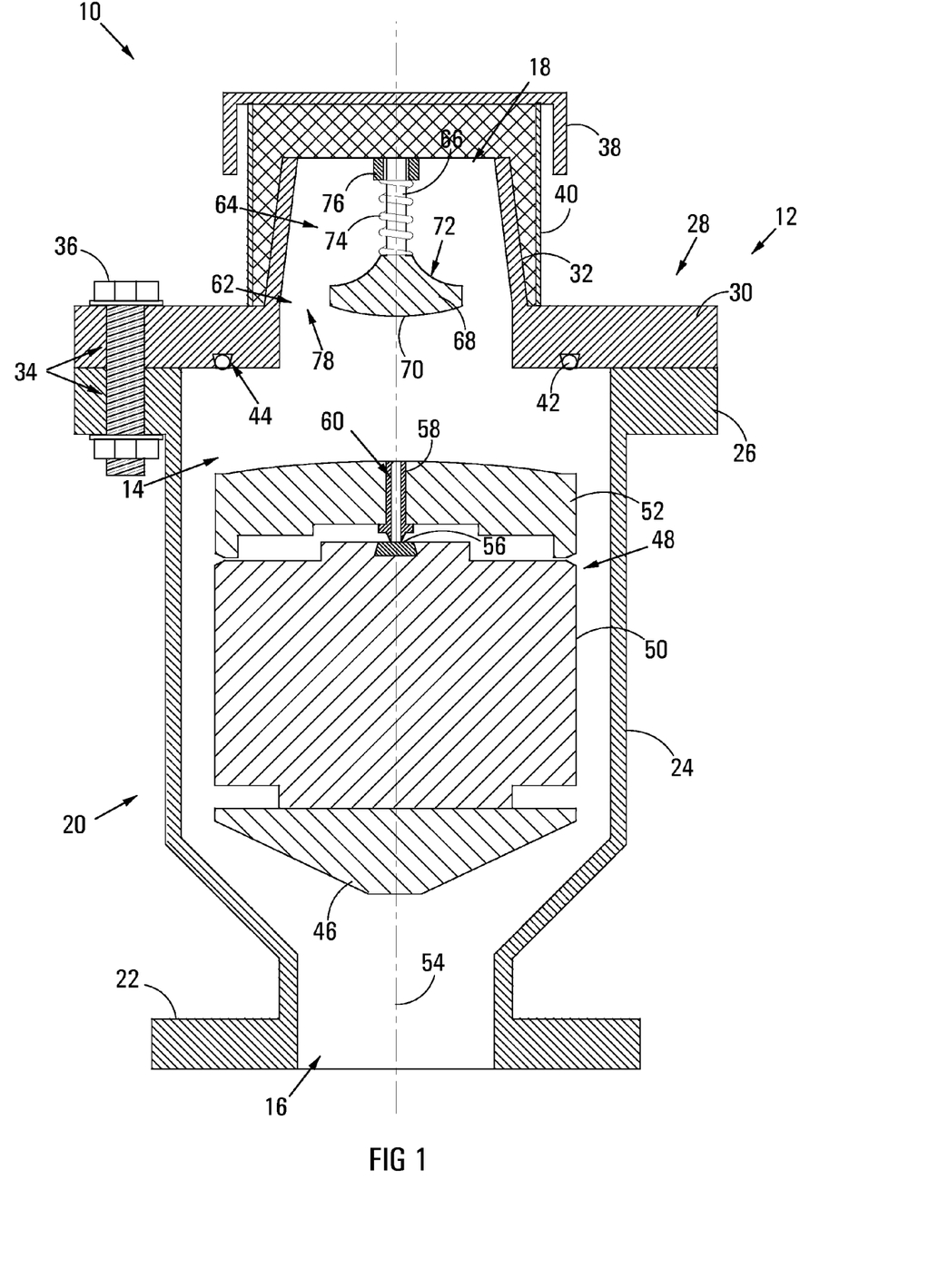
FIG. 1 shows a partial axial sectional view of an air release valve in accordance with the invention.

Referring now to FIGS. 1 and 2 of the drawings, an air release valve, in accordance with the invention, is generally indicated by reference numeral 10. The valve 10 includes a housing 12 defining a chamber 14. An inlet 16 leads into the chamber 14 and an outlet 18 leads out of the chamber.

The housing includes a valve body, generally indicated by reference numeral 20, having a bottom 22 through which the inlet 16 extends. The body 20 further includes a tubular central part 24 which extends upwardly from the bottom 22. A flange 26 protrudes from the upper end of the central part 24. The body 20 further includes a top 28 which includes a flange 30 and a neck 32 protruding from the flange 30. The outer diameter of the flange 30 corresponds to the outer diameter of the flange 26, however, the inner diameter of the flange 30 is smaller than the inner diameter of the flange 36 such that an inner portion of the flange 30 protrudes inwardly beyond an inner surface of the central part 24.

Corresponding circumferentially spaced holes 34, one of which is shown in FIG. 1 of the drawings, extend through the flanges 26, 30 and the top is secured in position by fasteners 36, i.e. nut and bolt arrangements, extending through the holes 34.

The neck 32 tapers upwardly inwardly away from the flange 30, the upper end of the neck 32 defining the outlet 18.

A cap 38 is positioned over the outlet 18 and a circular cylindrical screen 40 in the form of a mesh is provided between the cap 38 and the flange 30. The cap 38 and screen 40 inhibit the ingress of foreign matter, such as dirt, insects or the like, into the valve 10, particularly when the valve is functioning as a vacuum relief valve as described in more detail herebelow.

An annular seal in the form of an O-ring 42 is provided in an annular recess 44 in the portion of the flange 30 which protrudes inwardly beyond the radially inner edge of the flange 36. The O-ring 42 forms a valve seat, as described in more detail herebelow.

A support or baffle plate 46 is mounted in the chamber 14 above the inlet such that fluid can flow in a substantially unimpeded manner between the support 46 and the housing 12.

A closure member, generally indicated by reference numeral 48 is mounted in the chamber 14 between the support 46 and the valve seat defined by the O-ring 42. The closure member 48 comprises a lower buoyant member 50 and an upper buoyant member 52 which are displaceable independently of one another vertically along a longitudinal axis 54 with a suitable guide arrangement (not shown) being provided to guide the upper and lower buoyant members 52, 50. Both the lower buoyant member 50 and the upper buoyant member 52 have a specific gravity which is less than that of the liquid with which the valve is intended to be used. Hence, when the liquid is water, the members 50, 52 have a specific gravity of about 0.95.

The lower buoyant member 50 includes, on an upper surface thereof, a seat 56.

The upper buoyant member 52 has a centrally disposed tubular element 58 extending therethrough and defining an orifice 60. When the lower buoyant member 50 and upper buoyant member 52 are in abutment a protruding lower portion of the tubular element 58 seats on the seat 56.

As is clear from the drawings, when the tubular element 58 seats on the seat 56, there is a relatively small gap between the upper surface of the lower buoyant member 50 and a lower surface of the upper buoyant member 52. Adjacent edges of the buoyant members 50, 52 are chamfered and the facing surfaces of the two members 50, 52 are stepped. This arrangement the Inventor believes will ensure that when air passes these components either in the case of air being discharged or, under air intake condition, that a low pressure zone is created by the air turbulence at the chamfered edges. This low pressure prevents the two buoyant members from separating thereby resisting premature closure of the valve by displacement of the upper buoyant member 52 under the influence of air flow.

The valve 10 includes a variable throttle arrangement, generally indicated by reference numeral 62. The variable throttle arrangement 62 includes a flow control element, generally indicated by reference numeral 64 mounted in the neck 32. The flow control element includes a stem 66 which extends axially along the axis 54 and a throttle member or head 68 connected to the lower end of the stem 66. The throttle member 68 is circular and has a concave lower surface 70 and an annular convex upper surface 72 extending downwardly and outwardly from the lower end of the stem 66. The flow control element 64 is displaceable between a lower or rest position (shown in FIG. 1 of the drawings) and a raised position (shown in FIG. 2B of the drawings). The valve 10 includes a resilient bias arrangement, the flow control element 64 being urged towards its lower position by a coil spring 74 which extends around the stem 66 and is mounted in compression between the throttle member 68 and a sleeve 76 through which the stem 66 extends. The sleeve 76 is supported by circumferentially spaced, radially extending spider limbs (not shown) which connect the sleeve 76 to the neck 32. It will be appreciated that the valve 10 is biased towards its rest position.

An annular space 78 is defined between the throttle member 68 and the inner surface of the neck 32. It will be appreciated, however, that, by virtue of the taper of the neck 32 the area of the annular space 78 between the throttle member 68 and the neck 32 is at a maximum when the throttle member is in its lower position and at a minimum when the throttle member is in its raised position.

Figure 2A:
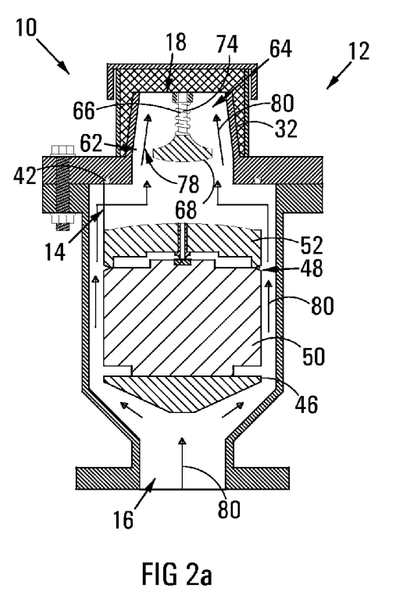
FIGS. 2A to 2D illustrate schematically the operation of the valve of FIG. 1.

With reference now particularly to FIGS. 2A to 2D, the operation of the valve 10 is described. The valve 10 is connected to a pipeline, typically, a water pipeline, with the inlet 16 being in communication with the pipeline. Typically, the valve 10 will be connected to the pipeline by the bottom being connected to a standpipe in the region where the pipeline defines a crest i.e. a region where air is likely to accumulate and is to be purged from the pipeline. An initial condition is assumed in which the entire air release valve 10 is devoid of water and filled with air as shown in FIGS. 1 and 2A. In this configuration, both the lower buoyant member 50 and upper buoyant member 52 are in their lower positions with the lower buoyant member 50 resting on the support 46 and the upper buoyant member 52 resting on the lower buoyant member 50.

When water is introduced into the pipeline, air contained in the pipeline ahead of the approaching water is pressurised and flows in the direction of arrows 80 (FIG. 2A) upwardly through the inlet 16 past the support 46 and the buoyant members 50, 52, and between the throttle member 68 and the inner surface of the neck 32 before being discharged from the outlet 18.

Figure 2B:
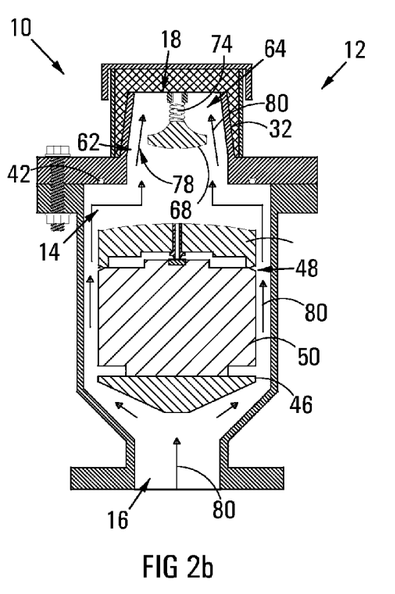

If the rate of air flow increases excessively there is a risk that when water enters, it causes the buoyant member 50 and 52 to move upwardly so that the upper buoyant member seats sealingly against the O-ring 42 thereby rapidly stopping the flow of water through the valve 10 and causing a transient which could cause damage to the pipeline. To prevent this, the configuration of the throttle member 68, the neck 32 and the coil spring 74 are selected such that as the rate of air flow increases, the throttle member 68 is displaced upwardly (as shown in FIG. 2B) thereby reducing the area of the annular space 78 between the throttle member 68 and the inner surface of the neck 32 thereby effectively increasing the resistance to air flow and limiting the velocity of the air and hence the water column to a velocity below that which would cause a transient when the buoyant members 50 and 52 are displaced upwardly and the upper buoyant member is in its closed position in which it seats sealingly against the valve seat defined by the O-ring 42.

It will be appreciated that should the air velocity decrease, the throttle member 68 will be urged downwardly by the coil spring 74, thereby increasing the area of the annular space 78 through which the air can pass and hence optimising the rate of air flow in order to empty the pipeline of air as fast as possible but at the same time maintaining the velocity of air flow below a critical air velocity to prevent displacement of the upper buoyant member 52 upwardly. It will further be appreciated that this infinite adjustment of the throttle member 68 ensures that there is no sudden interruption of air flow resulting in the air forming a buffer within the associated pipeline which will reduce possible surge and water hammer effects.

The fact that the surface 70 is convex increases the surface area compared to a flat surface which, the Inventor believes will increase the sensitivity and reaction to pressure differential changes between atmosphere and the interior of the chamber 14.

Figure 2C:
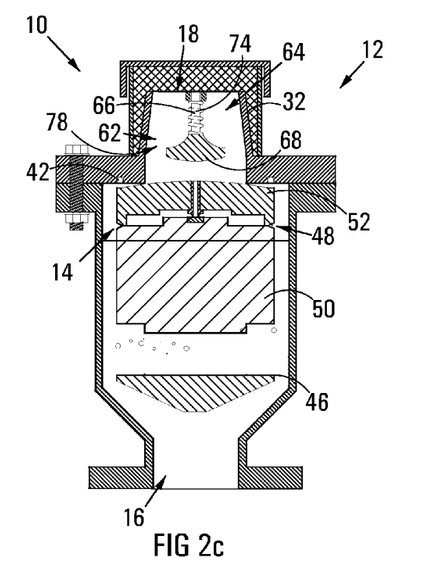

As illustrated in FIG. 2C of the drawings, when water reaches the valve 10 under normal conditions and rises within the chamber 14, the lower buoyant member 50 is urged upwardly as the water level rises. As the water level continues to rise, the upper buoyant member 52 eventually abuts against the valve seat formed by the O-ring 42 thereby effectively closing off the valve 10 with only a limited amount of air remaining within the chamber 14. As a result of the gradual decrease in the velocity of the air as the throttle member 68 moves upwardly, the rate of air flow and hence the water flow rate decreases as the pipeline fills. Accordingly, there is no sudden, large reduction in water flow rate when the valve finally closes thereby reducing the risk of water hammer or other hydraulic shock effects which potentially could cause damage to the valve and/or pipeline.

Figure 2D:
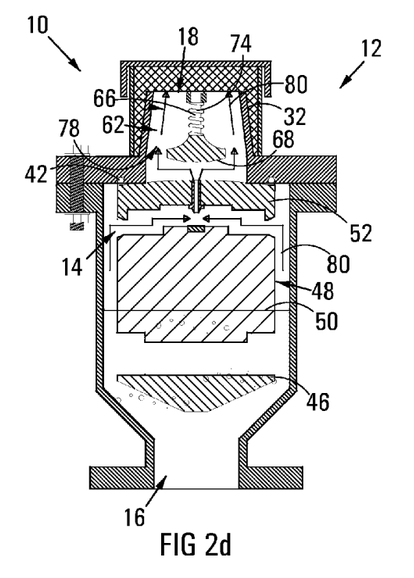

Subsequently, if for any reason, the water level in the chamber 14 decreases, e.g. as a result of the accumulation of air within the chamber 14, the lower buoyant member 50 may move downwardly together with the level of the water (as illustrated in FIG. 2D). However, the pressure of air within the chamber will typically be sufficient to retain the upper buoyant member 52 in abutment with the valve seat, and air contained within the chamber 34 may be exhausted to atmosphere through the orifice 60 defined by the tubular element 58. As the air is exhausted, the water level will once again rise until such time as the seat 56 abuts against the lower end of the tubular element 58 once again closing off the valve 10.

If, for any reason, it is desired to drain the pipeline, as the water level within the chamber 14 decreases, both the lower buoyant member 50 and upper buoyant member 52 will move downwardly. Air can then enter the valve 10 through the outlet 18 and eventually into the pipeline in the direction opposite to that indicated by the arrows 80. In this regard, the convex upper surface 72 of the throttle member 68 facilitates the flow of air thereby preventing a vacuum from forming in the pipeline which could delay the draining of the pipeline and/or cause damage to the pipeline.

Figure 3:
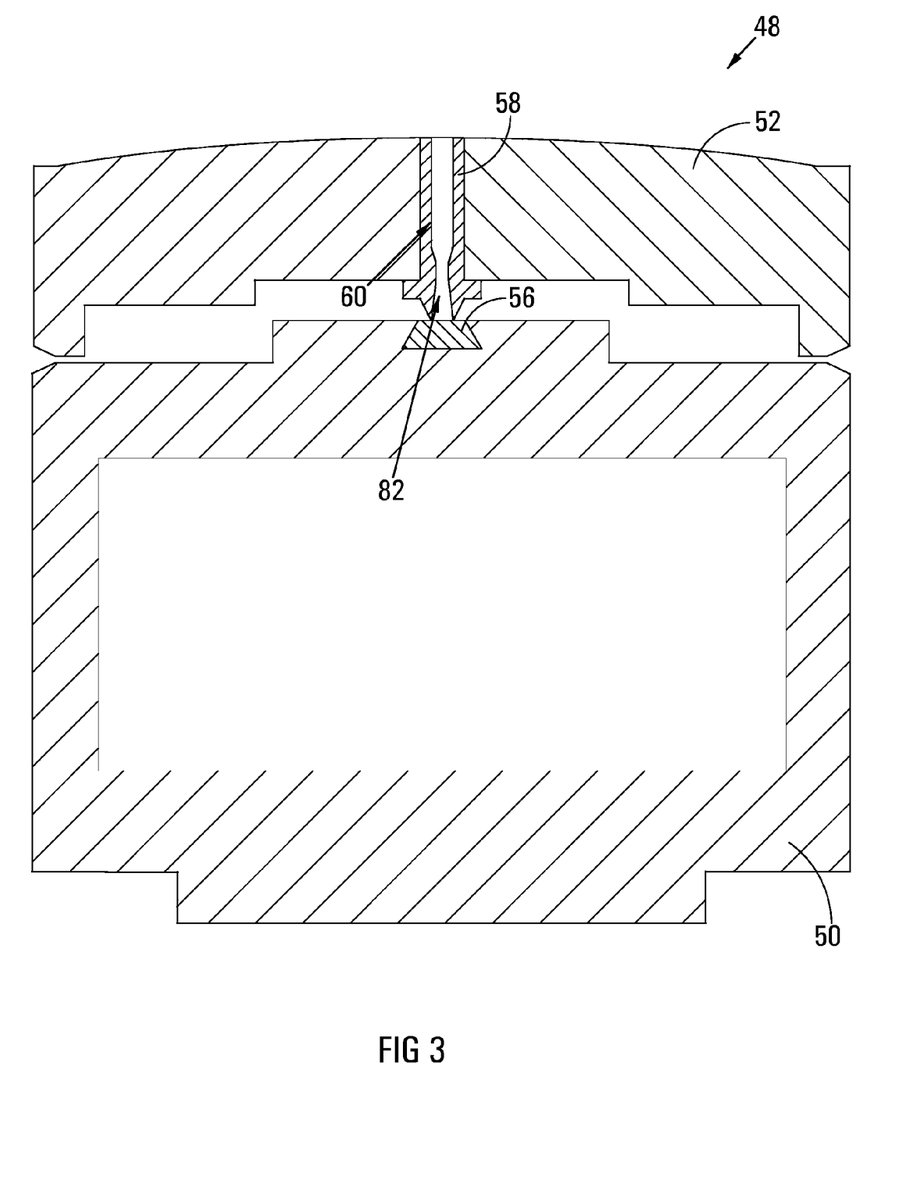
FIG. 3 shows, on enlarged scale, an alternative upper and lower buoyant member forming part of a closure member of the valve of FIG. 1.

In one embodiment, as can best be seen in FIG. 3 of the drawings, the lower end of the tubular element 58 defines a throat 82 which functions in the form of a venturi which, the Inventor believes, will provide the tubular element with a self-cleaning effect. In addition, the lower buoyant member 50 is hollow and of light weight. By virtue of being hollow, the buoyancy of the buoyant member 50 is increased. A further aspect of the hollow buoyant member 50 is that, when the valve 10 is closed, it, together with any other air positioned in the chamber 14, serves to cushion surge pressure created within the pipeline and reduce any damaging effects they may have.

Figure 4:
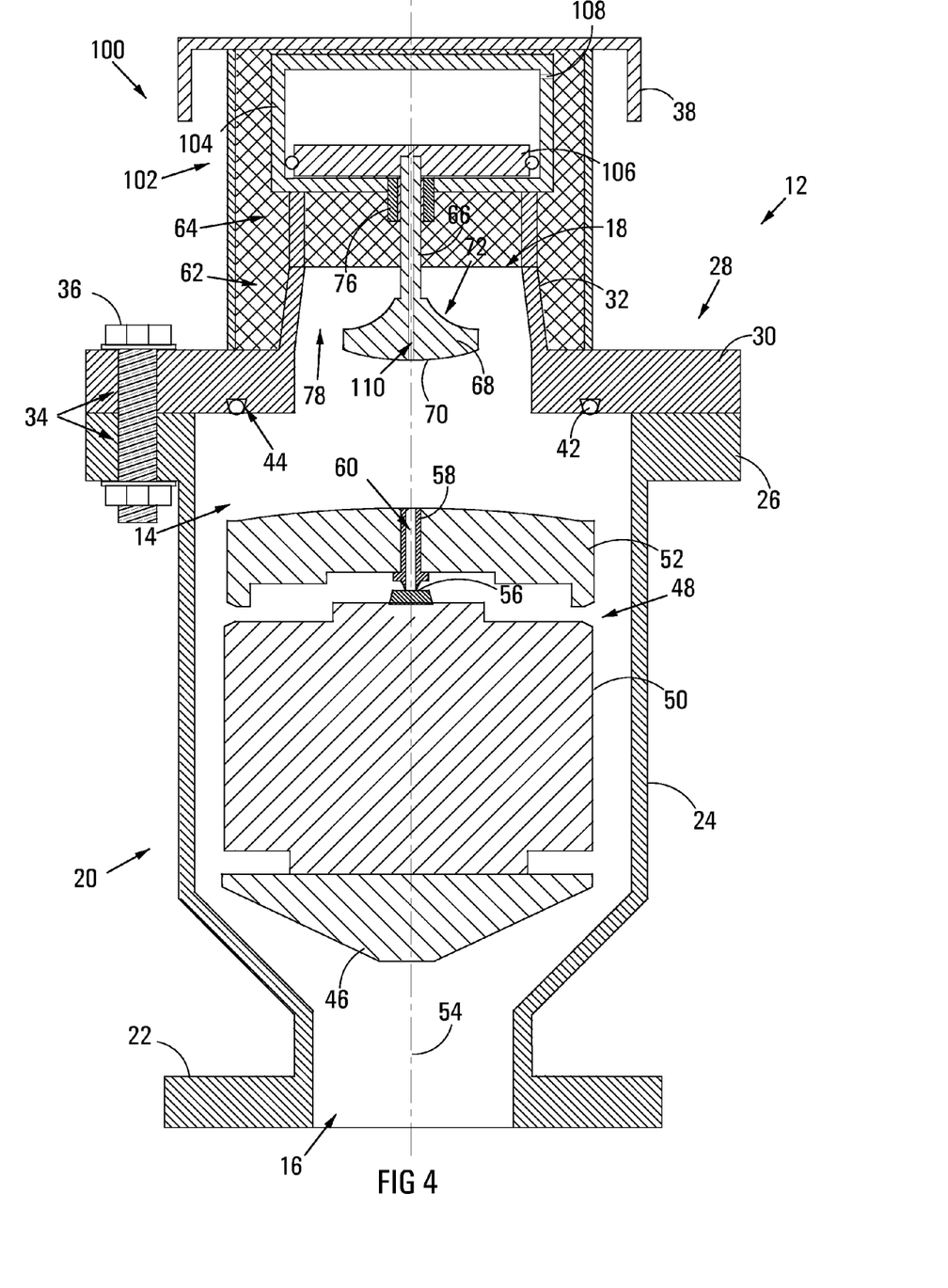
FIG. 4 shows a sectional view similar to FIG. 1 of another embodiment of an air release valve in accordance with the invention.

Reference is now made to FIG. 4 of the drawings, in which reference numeral 100 refers generally to another valve in accordance with the invention and, unless otherwise indicated, the same reference numerals used above are used to designate similar parts.

The main difference between the valve 100 and the valve 10 is in respect of the flow control element 64. In this embodiment of the invention, the upper end of the stem 66 is connected to a damping arrangement, generally indicated by reference numeral 102. The damping arrangement 102 includes a cylinder 104 within which a piston 106 is mounted for vertical reciprocation. An upper end of the stem 66 is connected to the piston.

A bleed opening 108 leads from the upper end of the cylinder above the piston 106. An axially extending passage 110 extends through the throttle member 68, stem 66 and piston 106 thereby connecting the interior of the cylinder 104 above the piston 106 (and thus also the bleed opening 108) in flow communication with the chamber 14.

In use, the valve 100 functions in substantially the identical fashion to the valve 10 except the spring 74 is replaced by the damping arrangement 102. In this embodiment, when the pipeline is being filled with water and purged of air, the flow control element 64 will be urged upwardly in the manner described above. Air will also enter the cylinder through the passage 110 and be discharged therefrom through the bleed opening 108. The area of the piston 106 is selected to be greater than that of the throttle member 68 which creates a resisting downward force. The downward force is controlled by the amount of air allowed to discharge through the bleed opening 108. An increasing differential pressure across the lower surface of the throttle member 68 and the upper surface of the piston 106 caused by an increase in the pressure inside the chamber 14 eventually results in the throttle member 68 moving upwardly. However, the downward resisting force exerted by the damping arrangement has a damping effect on the upward movement. As the throttle member 68 is progressively urged upwardly, the annular space 78 between the throttle member 68 and the inner surface of the neck 32 decreases which, together with the damping effect, provides a smooth discharge of air and prevents premature closing or valve slam as a result of the rate of air flow over the upper buoyant member 52 exceeding a maximum desired velocity.

Figure 5:
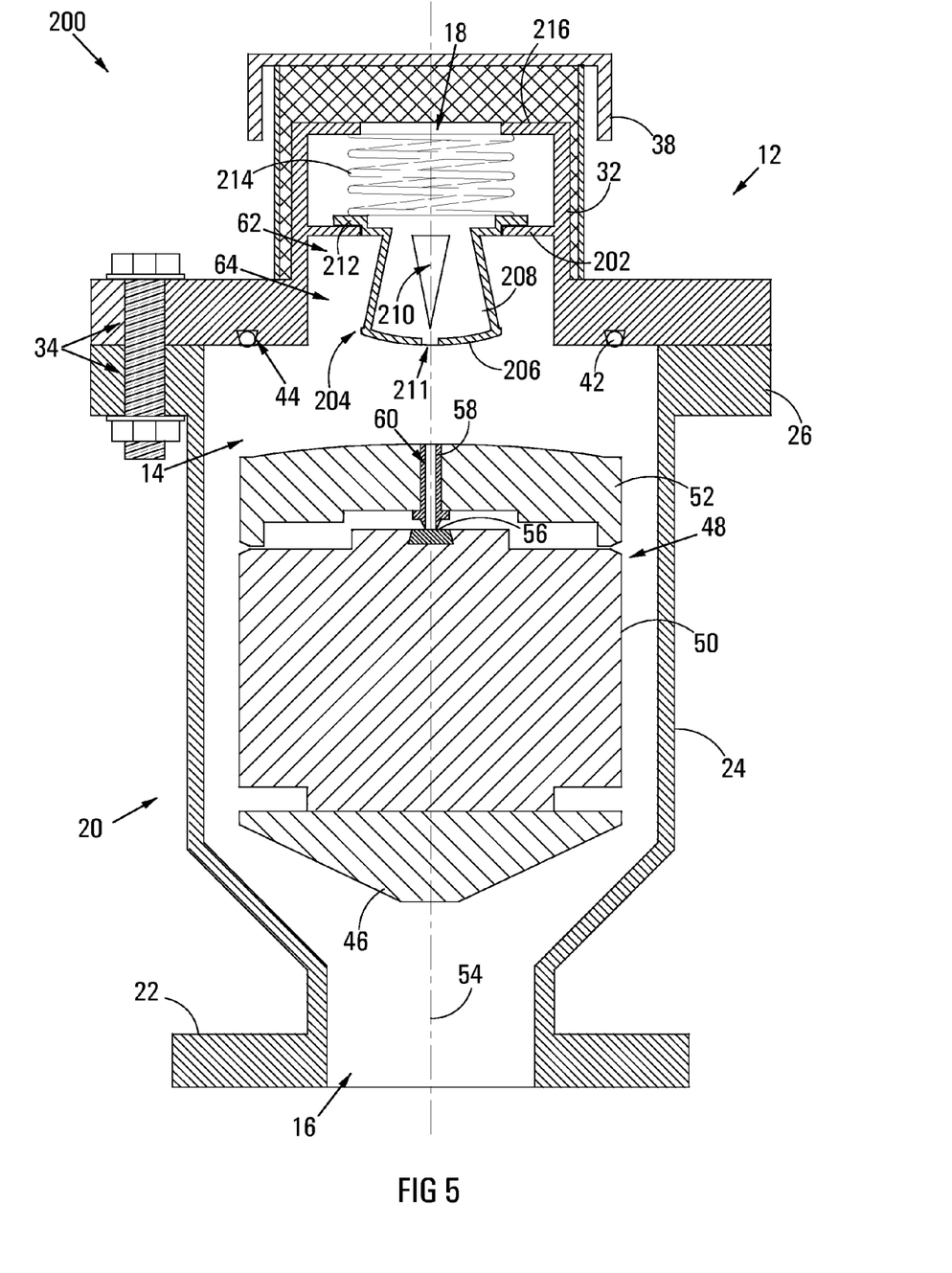
FIG. 5 shows a partial sectional view similar to FIG. 1 of yet another embodiment of an air release valve in accordance with the invention.

Reference is now made to FIG. 5 of the drawings, in which reference numeral 200 refers generally to another valve in accordance with the invention and, unless otherwise indicated, the same reference numerals used above are used to designate similar parts.

In this embodiment of the invention, the neck 32 is circular cylindrical and includes an annular shoulder 202 protruding radially inwardly approximately midway between the upper and lower ends of the neck. The flow control element 64 includes a hollow body 204 having a base 206 and a side wall 208 which tapers upwardly inwardly away from the base 206. A plurality of circumferentially spaced generally triangular slots 210 is provided in the side wall 208. The width of each of the slots 210 increases away from the base. The body 204 includes a circumferentially extending flange 212. A coil spring 214 is mounted in compression between the flange 212 and a stop 216 provided at the upper end of the neck 32 urging the body 204 downwardly into its lower or rest position in which the flange 212 abuts against an upper surface of the shoulder 202. In this position, the side wall 208 protrudes through the shoulder 202, permitting substantially unimpeded air flow through the slots 210 and a hole 211 in the base 206.

The valve 200 functions in a similar fashion to the valves 10, 100. In this embodiment, as the rate of air flow increases, the body 204 is urged upwardly against the bias of the spring 214. By virtue of the shape of the slots 210 and the taper of the side wall 208, as the body moves upwardly, the area through which the air can flow is reduced once again serving to limit the velocity of the air and reduce the risk of premature closing of the valve.

Figure 6:
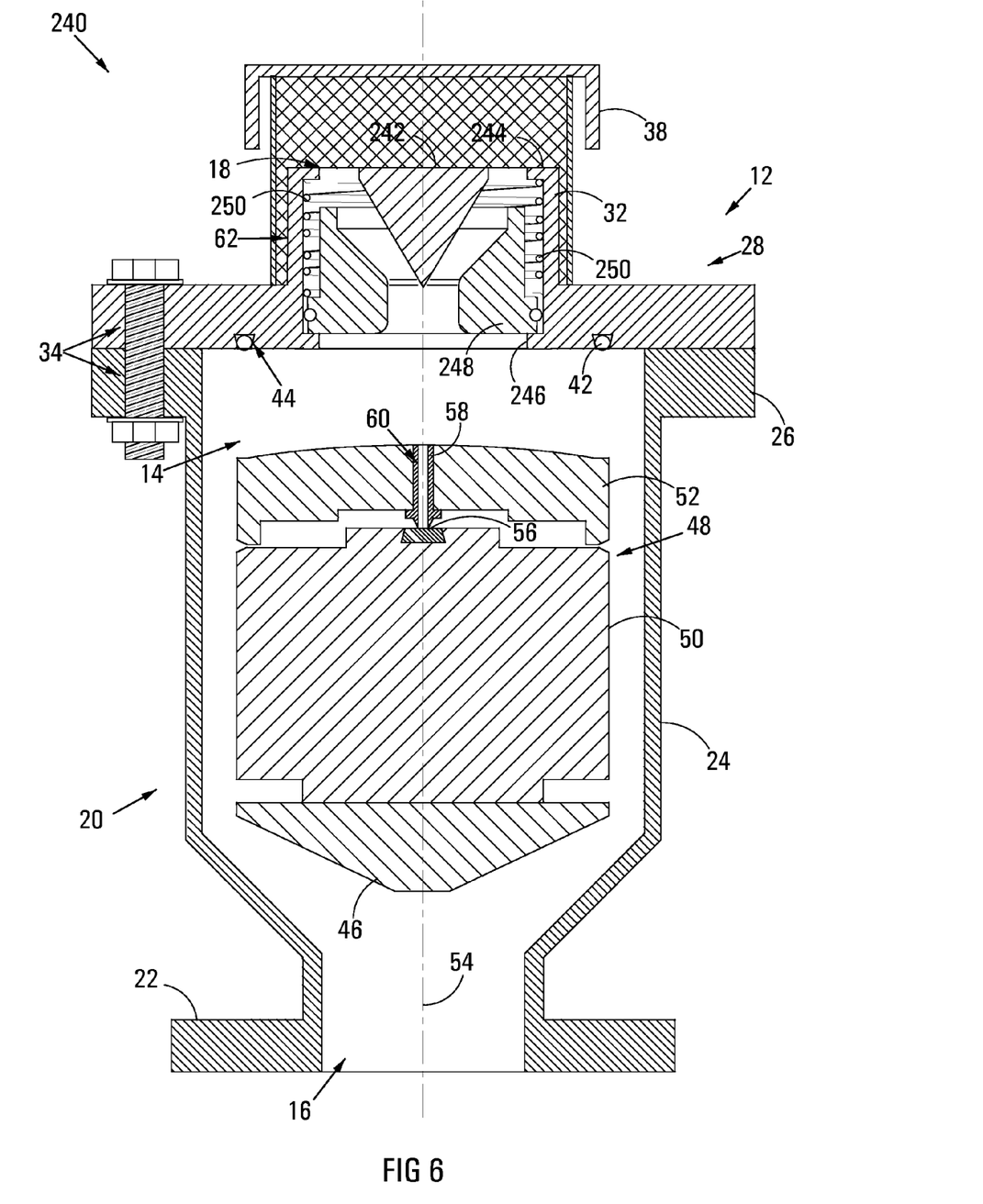
FIG. 6 shows a partial sectional view similar to FIG. 1 of still yet another embodiment of an air release valve in accordance with the invention.

Reference is now made to FIG. 6 of the drawings in which reference numeral 240 refers generally to another valve in accordance with the invention and, unless otherwise indicated, the same reference numerals used above are used to designate similar parts.

Once again, in this embodiment, the main difference between the valve 240 and the valve described above relate to the throttle arrangement 62.

In this embodiment, a conical restrictor 242 is mounted coaxially in the neck 32 (there being circumferentially spaced, radially extending spider limbs (not shown) connecting the restrictor 242 to the neck 32) such that the restrictor 242 tapers downwardly. Annular stops 244, 246 are provided at the top and bottom of the neck 32.

The neck 32 is circular cylindrical and a flow control element in the form of an annular shuttle 248 is slidably mounted in the neck 32 for axial displacement relative thereto. The valve 240 includes a resilient bias arrangement, a coil spring 250 being mounted in compression between the stop 244 and the shuttle 248, urging the shuttle 248 towards its lower or rest position shown in FIG. 6 of the drawings. An annular flow path is defined between the shuttle 248 and the restrictor 242.

In use, the valve 240 functions in substantially the identical fashion to the valves described above. Air entering the valve passes through the valve chamber between the shuttle 248 and the restrictor 242. As the pressure and velocity of the air increases, the shuttle 248 is urged upwardly against the bias of the spring 250 thereby decreasing the area between the shuttle 248 and the restrictor 242 through which the air can flow. This throttling effect serves to limit the maximum velocity of the air and avoid premature closing of the valve and potential damage, in the manner described above.

The Inventor believes that a valve in accordance with the invention will, by virtue of the infinitely variable throttling effect provided by the throttle arrangement 62 serve to ensure that the throttling arrangement 62 adjusts automatically to the operating conditions of the pipeline ensuring that the discharge area is always such that sufficient air is released to prevent mass oscillation or surges in the pipeline but that the discharge of air is throttled in such a fashion as to provide sufficient back pressure to slow down the air discharge rate and thereby the approaching water and hence limit potential transients such as water hammer which could lead to damage to the pipeline. As an addition, the operation of the throttling arrangement 62 is such that it limits the pressure drop across the upper buoyant member 50 so that it never becomes sufficiently great to result in premature closing of the valve.

Further, the Inventor believes that the configuration of the valve is such that the flow path is less complicated than with prior art valves of which he is aware thereby reducing the resistance of flow through the valve. This, the Inventor believes, may permit a smaller valve to be used than is the case with the prior art with a potential cost saving.

The invention claimed is:
1. An air release valve which includes:
a housing defining a chamber;
an inlet leading into the chamber at or towards the bottom thereof, the inlet being connectable to a fluid reticulation system;
an outlet leading from the chamber at or towards a top thereof;
a valve seat positioned between the inlet and the outlet;
a buoyant closure member positioned in the chamber and displaceable between a lower position in which it is clear of the valve seat and permits the flow of fluid through the chamber and an upper position in which it seats sealingly against the valve seat to interrupt the flow of fluid through the chamber, the closure member being displaced, in use, from its lower position to its raised position by the buoyant forces acting thereon as a result of the entry of liquid into the chamber through the inlet; and
a variable throttle arrangement for providing a throttling effect, the throttle arrangement being positioned between the valve seat and the outlet and being configured to throttle air flow and inhibit premature closing of the closure member and including a flow control element which is displaceable, under the influence of air flow from the inlet to the outlet, from a rest position towards a displaced position in which there is a greater throttling effect than at the rest position, the flow control element being biased towards its rest position, the chamber being elongate and having a longitudinal axis which extends vertically, the inlet and outlet being arranged coaxially at vertically spaced apart positions, the housing including a valve body having a bottom through which the inlet extends, a tubular central part extending upwardly from the bottom, a top which has an aperture extending therethrough and which defines the valve seat around the aperture and a neck extending upwardly from the top and defining a flow path in the neck.

2. A valve as claimed in claim 1, in which the cross-sectional area of the flow path diverges away from an upper end of the neck for at least part of the length of the flow path.

3. A valve as claimed in claim 1, in which the throttle arrangement includes a restrictor mounted in the neck and an annular shuttle which is longitudinally displaceable relative to the restrictor between a rest position in which the space between the shuttle and the restrictor is at a maximum and the throttling effect is at a minimum and a displaced position in which the space between the shuttle and the restrictor is at a minimum and the throttling effect is at a maximum, the valve including a stop located on the neck and the shuttle being urged towards its rest position by means of a coil spring mounted in compression between the shuttle and the stop.

4. A valve as claimed in claim 1, in which the closure member includes a lower buoyant member and an upper buoyant member, each including axially spaced upper and lower surfaces, with an axially extending orifice extending through the upper buoyant member, the upper surface of the upper buoyant member being configured to seat sealingly against the valve seat and the upper buoyant member being arranged coaxially with the lower buoyant member and being axially displaceable relative thereto, the orifice having an upper and a lower end which respectively open out of the upper and lower surfaces of the upper buoyant member, and the lower buoyant member including a complementary seal on the upper surface thereof such that, in use, when the upper and lower buoyant members are in abutment, the lower end of the orifice is sealed against the complementary seal.

5. A valve as claimed in claim 4, in which a portion of the orifice at or adjacent the lower end of the upper buoyant member is in the form of a venturi which has a self-cleaning effect.

6. A valve as claimed in claim 1, in which the throttle arrangement includes an annular shoulder provided in the neck, the shoulder defining an axial passage, the flow control element having a body with an upper end which extends through the passage, the body being hollow and having a base and a side wall which extends upwardly from the base, with at least one slot being provided in the side wall, with the width of the at least one slot increasing away from the base and the body being axially displaceable relative to the shoulder, the base being convex and an opening extending through the base.

7. A valve as claimed in claim 6, in which the flow control element is urged towards its rest position by means of a coil spring mounted in compression between the flow control element and a stop provided on the neck and above the shoulder.

8. A valve as claimed in claim 6, in which the side wall tapers inwardly away from the base.

9. A valve as claimed in claim 1, in which the flow control element includes a throttle member, the flow control element being mounted in the flow path for displacement between a rest position, towards which it is biased and in which the area between the throttle member and the neck is at a maximum, and a displaced position in which the area between the throttle member and the neck is reduced.

10. A valve as claimed in claim 9, in which the throttle member is circular and has a convex lower surface.

11. A valve as claimed in claim 9, in which the throttle member has an upper surface in which an annular concave recess is provided.

12. A valve as claimed in claim 9, in which the flow control element includes a stem which extends axially and has a lower end to which the throttle member is connected.

13. A valve as claimed in claim 12, in which the stem is supported for axial displacement in a guide, the throttle member being urged towards its lower position by a spring mounted between the guide and the throttle member.

14. A valve as claimed in claim 12, in which the upper end of the stem is connected to a damping arrangement, the damping arrangement including a cylinder within which a piston is mounted for vertical reciprocation, an upper end of the stem being connected to the piston, the outlet being in the form of a bleed opening which opens out of the cylinder at or towards a top thereof connecting the interior of the cylinder above the piston in flow communication with the atmosphere, a passage extending through the flow control element and the piston such that a lower end of the passage opens out of the lower surface of the throttle member and an upper end of the passage opens out of the piston into the cylinder above the piston.

15. An air release valve which includes:
a housing defining a chamber;
an inlet leading into the chamber at or towards the bottom thereof, the inlet being connectable to a fluid reticulation system;
an outlet leading from the chamber at or towards a top thereof;
a valve seat positioned between the inlet and the outlet;
a buoyant closure member positioned in the chamber and displaceable between a lower position in which it is clear of the valve seat and permits the flow of fluid through the chamber and an upper position in which it seats sealingly against the valve seat to interrupt the flow of fluid through the chamber, the closure member being displaced, in use, from its lower position to its raised position by the buoyant forces acting thereon as a result of the entry of liquid into the chamber through the inlet; and a variable throttle arrangement for providing a throttling effect, the throttle arrangement being positioned between the inlet and the outlet and including a flow control element which is displaceable, under the influence of air flow from the inlet to the outlet, from a rest position in which the throttling effect is at a minimum, towards a displaced position, in which the throttling effect is at a maximum, and a resilient bias arrangement biasing the flow control element towards its rest position, the chamber being elongate and having a longitudinal axis which extends vertically, the inlet and outlet being arranged coaxially at vertically spaced apart positions, the housing including a valve body having a bottom through which the inlet extends, a tubular central part extending upwardly from the bottom, a top which has an aperture extending therethrough and which defines the valve seat around the aperture and a neck extending upwardly from the top and defining a flow path in the neck.

16. A valve as claimed in claim 15, in which the throttle arrangement is positioned between the valve seat and the outlet.

17. A method of venting air from a pipeline during filling thereof with a liquid, the method including the steps of providing an air release valve having a housing defining a chamber, an inlet leading into the chamber at or towards the bottom thereof and which is connected in flow communication with the pipeline, an outlet leading from the chamber at or towards a top thereof, a valve seat position between the inlet and the outlet, and a buoyant closure member positioned in the chamber and displaceable between a lower position, in which it is clear of the valve seat and permits the flow of air through it through the chamber, and an upper position, in which it seats sealingly against the valve seat to interrupt the flow of fluid through the chamber, and including a flow control element which is displaceable, under the influence of air flow from the inlet to the outlet, from a rest position towards a displaced position in which there is a greater throttling effect than at the rest position, the flow control element being biased towards its rest position, the chamber being elongate and having a longitudinal axis which extends vertically, the inlet and outlet being arranged coaxially at vertically spaced apart positions, the housing including a valve body having a bottom through which the inlet extends, a tubular central part extending upwardly from the bottom, a top which has an aperture extending therethrough and which defines the valve seat around the aperture and a neck extending upwardly from the top and defining a flow path in the neck, which method includes throttling air flow through the valve by means of a variable throttle arrangement to limit the rate of flow and inhibit premature closing of the closure member.

18. A method as claimed in claim 17, in which the throttle arrangement is positioned between the valve seat and the outlet.

* * * * *